114-253. XR 3,353,232 SR
Nov. 21, 1967     I. F. BROWNSON     3,353,232
DOUBLE HOOK
Filed Feb. 21, 1966
Fig. 1
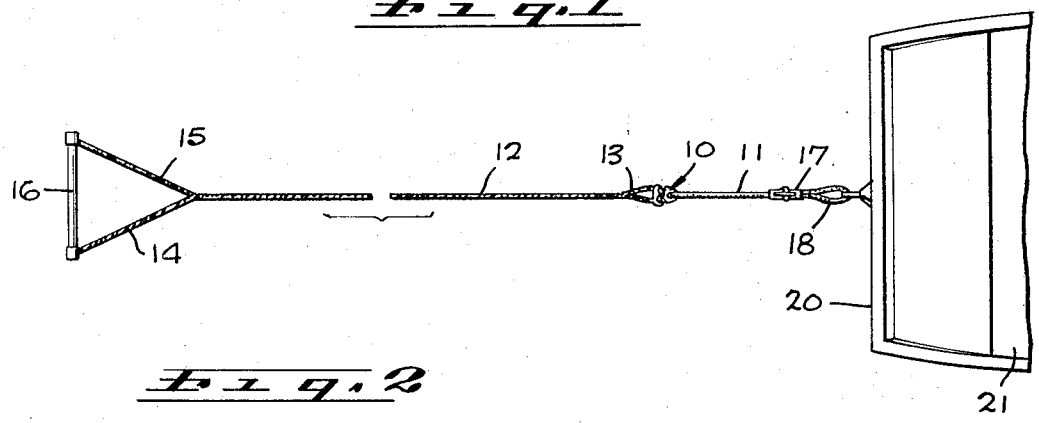
Fig. 2
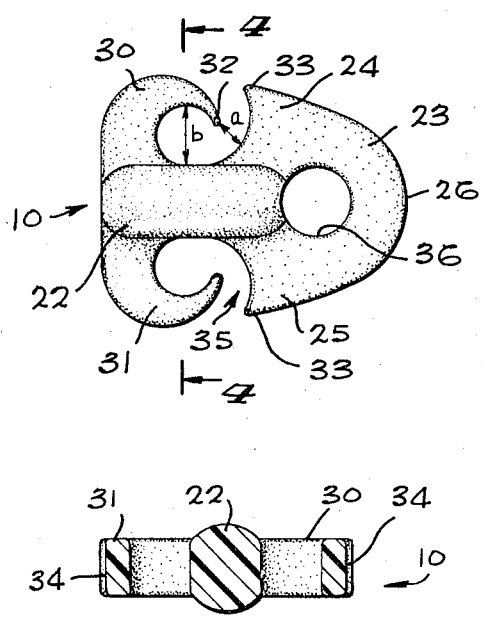
Fig. 3
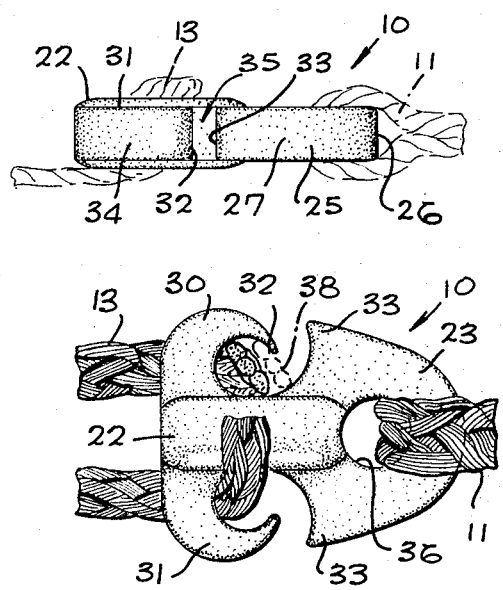
Fig. 4
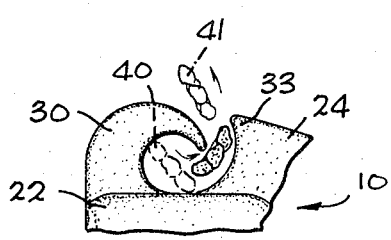
Fig. 5
Fig. 6
IVAN F. BROWNSON
INVENTOR.
BY R. E. Geauque
ATTORNEY

United States Patent Office 3,353,232
Patented Nov. 21, 1967

3,353,232
DOUBLE HOOK
Ivan F. Brownson, 16245 Otsego, Encino, Calif. 91316
Filed Feb. 21, 1966, Ser. No. 529,036
4 Claims. (Cl. 24—129)

This invention relates to double hooks and more particularly to a novel double hook having restricted openings leading into hooked receptables for passing a thickness of a braided rope or compressible rope into the receptacles.

Conventional rope hooks have been employed in the past which include curved extensions terminating in hook members that curve inwardly in the same horizontal plane toward a common shank or arm. Such a conventional double hook is described in U.S. Patent 1,397,051.

However, difficulties have been encountered when employing such a double hook which stem largely from the fact that a rope or line trained over the hook is held in gripping relationship on the hook members only when the rope or line is taut or under tension. When the rope is slack, the rope portions disposed about the hook members may readily pass unrestricted between the ends of the hook members and the shank or body of the hook. Therefore, in applications such as is encountered in towing procedures, the rope is constantly subjected to alternating conditions of tautness and slack so that double hooks of conventional design cannot be relied upon to firmly hold a tow rope. Furthermore, when the rope is slack, the rope may be easily slid or pulled through the hook members so that the towing load may be easily unbalanced.

Accordingly, the double hook of the present invention obviates the difficulties and problems encountered with conventional devices by providing a body portion having an apertured head member carried on one end thereof that is provided with oppositely projecting lobes and having curved extensions forming a double hook carried on the other end of the body portion. Each curved extension includes a terminating tapered end which is disposed in fixed spaced relationship with respect to each of the respective head member lobes so that a restricted passageway is created therebetween. The diameter of the curve about which the extensions are formed is intentionally dimensioned larger than the width of the passageway so that a rope having a dimension larger than the passageway width may be accommodated within the double hook slots or receptacles formed by the curved extensions. Therefore, the rope must be compressed or squeezed through the passageway to permit the rope to be assembled on the hook or to be removed therefrom. Alternately, a braided rope may be more readily received into the receptacles of the hook members by providing a braid thickness which will easily push through the passageway but having a dimensional width substantially larger than the passageway so as to prevent passage of the rope width-wise therethrough.

By providing restricted entrances into the receptacles of the hook members, the rope portions held by the hook members will be maintained within the receptacle of the hook members and will not inadvertently become disengaged with the double hook when tension of the tow rope is released. Therefore, it is a primary object of the present invention to provide a novel double hook which incorporates a restricted passageway leading into hook member receptacles whereby the rope will be firmly held by the hook members and will not become inadvertently disengaged therefrom.

Another object of the present invention is to provide a novel single-piece double hook of plastic composition which is of extremely simple construction for economical manufacture.

Still another object of the present invention is to provide a novel double hook or fastener to which a length of braided rope may be firmly and properly secured thereto without the use of knots or other means of making fast by tying.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a plan view of the novel double hook of the present invention illustrating the hook as a means for coupling a water ski tow rope or line to a coupling line trailing from the aft end of a boat to form a tow line assembly;

FIGURE 2 is an enlarged plan view of the double hook illustrated in FIGURE 1;

FIGURE 3 is a side elevational view of the double hook shown in FIGURE 2 illustrating rope connections therewith in dotted lines;

FIGURE 4 is a cross-sectional view of the double hook shown in FIGURE 2 as taken in the general direction of arrows 4—4 thereof;

FIGURE 5 is a top plan view of the double hook illustrating alternate positions of a tow rope of the braided type coupled thereto; and FIGURE 6 is a fragmentary view of a portion of the double hook illustrating successive tow rope positions to effect disengagement of the rope from the hook member receptacles.

Referring to FIGURE 1, a novel double hook in accordance with the present invention is indicated in the general direction of arrow 10 and is illustrated in a water skiing towing application for connecting a coupling line 11 to a tow rope 12 to form a tow line assembly. One end of the tow rope 12 is provided with a loop 13 which is coupled to the double hook 10 and the opposite end of the tow rope 12 is split into a pair of bridle lines 14 and 15 having their free ends suitably attached to the opposite ends of a water skier's handle 16.

The coupling line 11 is attached by means of a loop formed on one end to the hook 10 while its opposite end is suitably attached to a coupling element 17 which includes a rope loop 18 suitably connected to a transom 20 carried on the aft end of a boat 21.

Referring now to FIGURE 2, an enlarged view of the double hook 10 is shown wherein the hook includes an elongated central body bortion or rib member 22 having a head member 23 carried on one end thereof which is provided with oppositely and laterally projecting side lobes 24 and 25. The head member is blunt nosed at point 26 and includes peripheral side edge surfaces, such as surface 27 in FIGURE 3, which diverge rearwardly from the blunt nose 26. Extending laterally from the end of the body portion or rib member 22 opposite to its end carrying the head member are curved hook-shaped extensions 30 and 31. Each curved extension includes a terminating tapered end as indicated by numeral 32 and is disposed in fixed spaced relationship with respect to the central rib member and the adjacent head member lobe 24 or 25, as the case may be, so that a restricted passageway or slots 35 is created therebetween. Each slot has an open end with a width dimension represented by the character a. The opposite closed end of each slot or passageway defines a generally circular receptacle or aperture having a width dimension or diameter represented by the character b. This diameter is intentionally dimensioned larger than the width a of the open end of each slot or passageway 35 so that a rope having a dimension larger than the passageway width may be accommodated within the double hook receptacle formed by the curved extension. It is to be particularly noted that a tip 33 associated with each lobe of the head member projects outwardly a substantial distance beyond the terminating end 32 of the curved extension. Therefore, a guide means is provided between the outside periphery of the curved extension and the inside wall of the lobe which extends from the tip 33 to the body portion 22 into which a suitable rope or line may be received when it is desired to connect the double hook to the rope or line.

The double hook member formed by the curved extensions are provided with a substantially vertical exterior peripheral surface 34 which extends from the tip 32 of each curved extension around each curved extension to meet at the extreme end of the body section 22 opposite to its end carrying the head member 23. The curved extensions and the head member are provided with opposite flat planar surfaces that extend in the same plane.

It is to be particularly noted that the central rib member or body portion 22 has rounded surfaces which extend above the opposite planar surfaces presented by the extensions 30 and 31 and the head member 23. Therefore, the bight of the rope is laid over the raised portion of the body portion and each end of the rope is led downwardly through the receptacle area partially encircled by each of the curved extensions of the double hook member. Such a rope arrangement is shown in dotted lines and any application of tension on either end of the rope will cause a gripping contact between the rope and the raised portion of the body portion immediately over which the rope passes so that the rope will be firmly held when the rope is drawn taut. An aperture 36 communicates the opposite planar surfaces of the head member and may be used to hold a loop formed in another rope or line as indicated in dotted lines by the numeral 11. The double hook is maintained fixed to the loop 11 whereas the loop 13 carried by the rope 12 may be detachably connected with the double hook member as desired. With reference to FIGURE 4, the relationship of the raised body portion above the opposite planar surfaces of the extensions is clearly illustrated.

Referring now to FIGURE 5, the rope loop 13 is shown as a braided nylon filament rope wherein the thickness of the braid is substantially reduced as compared to the width of the braid. This is more clearly shown in the illustration by the sectional view of the rope per se. As indicated in solid lines, the width of the rope is disposed within the receptacle formed by the curved portion of the extensions 30 and 31 and may be said to have a dimension substantially equal to the arrows b. Inasmuch as the width of the rope braid is greater than the dimension indicated by arrows a, the rope loop will be retained within the receptacles of the double hook. However, when slack occurs in the line 12, the loop is free to loosen the bight of rope extending across the body portion and the rope segments located within the extension receptacles are free to move within the receptacles to a position such as is indicated by the rope segment 38 shown in dotted lines. In this position, the width of the rope segment is greater than the passageway existing between the tip 32 of the extension and the lobe of the head member so that the rope will be retained within the double hook.

Referring now to FIGURE 6, a segment of the rope loop is illustrated in dotted lines as being within the receptacle of the extension 30 as represented by the numeral 40 preparatory to being disengaged from the hook member. As indicated in solid lines, the rope segment is turned edgewise so that the thickness of the rope segment will pass between the tip of the extension and the lobe of the head member in the direction of the arrows. Numeral 41 represents the rope segment completely disconnected from the hook member. It is to be understood that although the braided rope is used in connection with the description of the present invention, that a round rope having a diameter equal to the arrows represented by b may also be employed and that such a rope can be passed through the passageway by squeezing or compressing the round rope into an oblong cross-section so that the rope can be passed between the tip 32 of the extension and the lobe 33 of the head member. It will also be obvious to those skilled in the art, that any line or rope of a reasonable size adapted to be applied to the double hook member interposed over the body portion with the extended loop ends roved through the receptacles provided by the curved extensions 30 and 31, will upon the application of tension to either extended end of the rope, cause a gripping hold to be attached to that part of the line interposed between the extensions across the body portion.

As hereinbefore referred to, the improved double hook of the present invention may be adapted to be used as an intermediate connection between a tow rope and a trailing rope coupled to a transome of a boat and when so used, it will prevent the accidental dislocation of the tow rope loop 13 from the double hook when the rope is applied in the manner indicated. The novel double hook as contemplated, consists as illustrated in the drawings, of a single-piece molding which is preferably composed of plastic-like material such as nylon, for example.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:
1. A tow line assembly comprising:
   a double hook structure including an elongate unitary body having a head member at one end, a central longitudinal rib member extending from said head member to the opposite end of said body along the longitudinal axis of said body, and a pair of coplanar generally hook-shaped extensions at said opposite end of said body extending in opposite lateral directions from said rib member and longitudinally of said body toward said head member to define with said rib and head members slots having open ends opening through the lateral sides of said body and opposite closed ends;
   a connecting line secured at one end to said head member on said axis; and
   a tow line having a loop at one end extending from said tow line through one body slot and then across said rib member and back to said tow line through the other body slot.

2. A tow line assembly according to claim 1 wherein:
said head member includes generally flat laterally projecting side lobes disposed in the plane of said extensions;
said extensions have arcuate shapes and curve longitudinally of said body toward the adjacent side lobes and then laterally and inwardly of said body toward said rib member;
each said slot is bounded by a curved edge wall having an outer end portion furnished by a longitudinally presented edge surface of the adjacent side lobe, an intermediate portion furnished by an adjacent edge surface of said rib member, and an inner end portion furnished by an inner edge surface of the adjacent extension;
each side lobe has an outer edge surface which joins at an acute angle said longitudinally presented edge surface of the respective lobe to define an outer tip on the lobe;

each extension has a curved outer edge surface converging with and joining the inner edge surface of the respective extension to define on the extension a tapered arcuate extremity which curves laterally of and inwardly toward said rib member in spaced relation to the longitudinally presented edge surface of the adjacent side lobe and terminates in a pointed tip located laterally inwardly of said outer tip of the adjacent lobe;

each side lobe and the tapered extremity of the adjacent extension defining therebetween said open end of the adjacent body slot, and each extension and said rib member defining therebetween said closed end of the adjacent body slot;

said tow line having a width dimension greater than the width dimension of the open end of each body slot measured between said tip of each extension and said longitudinally presented edge surface of the adjacent side lobe; and the closed end of each body slot defining a generally circular aperture having a diameter approximating said width dimension of said tow line.

3. A tow line assembly according to claim 2 wherein:
said rib member has a convexly rounded side surface across which said tow line loop extends in the region between said slots, thereby to prevent cutting of said tow line by said body.

4. A double hook structure for a tow line assembly comprising:

a double hook structure including an elongate unitary body having a head member at one end, a central longitudinal rib member extending from said head member to the opposite end of said body along the longitudinal axis of said body, and a pair of coplanar generally hook-shaped extensions at said opposite end of said body extending in opposite lateral directions from said rib member and longitudinally of said body toward said head member to define with said rib and head members slots having open ends opening through the lateral sides of said body and opposite closed ends;

said head member including generally flat laterally projecting side lobes disposed in the plane of said extensions;

said extensions having arcuate shapes and curving longitudinally of said body toward the adjacent side lobes and then laterally and inwardly of said body toward said rib member;

each said slot being bounded by a curved edge wall having an outer end portion furnished by a longitudinally presented edge surface of the adjacent side lobe, an intermediate portion furnished by an adjacent edge surface of said rib member, and an inner end portion furnished by an inner edge surface of the adjacent extension;

each side lobe having an outer edge surface which joins at an acute angle said longitudinally presented edge surface of the respective lobe to define an outer tip on the lobe;

each extension having a curved outer edge surface converging with and adjoining the inner edge surface of the respective extension to define on the extension a tapered arcuate extremity which curves laterally of and inwardly toward said rib member in spaced relation to the longitudinally presented edge surface of the adjacent side lobe and terminates in a pointed tip located laterally inward of said outer tip of the adjacent lobe;

each side lobe and the tapered extremity of the adjacent extension defining therebetween said open end of the adjacent body slot, and each extension and said rib member defining therebetween said closed end of the adjacent body slot;

the closed end of each body slot defining a generally circular aperture having a diameter greater than the width of the open end of the respective slot measured between said tip of the adjacent extension and said longitudinally presented edge surface of the adjacent side lobe; and said rib member having convexly rounded side surfaces in the region between said slots.

References Cited

UNITED STATES PATENTS

| | | | |
|---|---|---|---|
| 240,866 | 5/1881 | Travers | 24—129 |
| 316,870 | 4/1885 | Braunfeld. | |
| 1,422,804 | 7/1922 | Witte | 24—129 |
| 1,679,042 | 7/1928 | Lemex | 24—230.5 |
| 1,755,291 | 4/1930 | Fox | 24—230.5 X |
| 1,942,734 | 1/1934 | Spindler. | |
| 2,370,358 | 2/1945 | Koch | 24—129 X |
| 3,058,184 | 10/1962 | Ritzheimer | 24—129 X |
| 3,235,927 | 2/1966 | Brown | 24—129 |

BERNARD A. GELAK, *Primary Examiner.*